(12) United States Patent
Gurris

(10) Patent No.: US 9,723,953 B2
(45) Date of Patent: Aug. 8, 2017

(54) BARBECUE ACCESSORY WITH A CHICKEN ROASTER

(75) Inventor: Matthias Gurris, Bruehl (DE)

(73) Assignee: GURRIS GMBH, Bruehl (DE)

( * ) Notice: Subject to any disclaimer, the term of this patent is extended or adjusted under 35 U.S.C. 154(b) by 157 days.

(21) Appl. No.: 13/981,073

(22) PCT Filed: Sep. 15, 2011

(86) PCT No.: PCT/EP2011/066047
§ 371 (c)(1),
(2), (4) Date: Jul. 22, 2013

(87) PCT Pub. No.: WO2012/079789
PCT Pub. Date: Jun. 21, 2012

(65) Prior Publication Data
US 2013/0298779 A1    Nov. 14, 2013

(30) Foreign Application Priority Data

Jan. 24, 2011 (DE) .................... 20 2011 001 877 U
Mar. 30, 2011 (DE) .................... 20 2011 004 636 U

(51) Int. Cl.
| A47J 37/10 | (2006.01) |
| A47J 37/06 | (2006.01) |
| A47J 37/07 | (2006.01) |
| A47J 43/18 | (2006.01) |

(52) U.S. Cl.
CPC .......... *A47J 37/06* (2013.01); *A47J 37/0786* (2013.01); *A47J 43/18* (2013.01)

(58) Field of Classification Search
None
See application file for complete search history.

(56) References Cited

U.S. PATENT DOCUMENTS

| 418,119 | A | * | 12/1889 | Fricker | 126/273 R |
| 1,725,521 | A | * | 8/1929 | Keiner | 126/25 R |
| 3,776,127 | A | * | 12/1973 | Muse | 99/482 |
| 4,094,295 | A | * | 6/1978 | Boswell et al. | 126/25 R |
| 4,512,249 | A | * | 4/1985 | Mentzel | 99/352 |
| 4,694,816 | A | * | 9/1987 | Fabbro | 126/41 R |
| 5,057,331 | A | * | 10/1991 | Levinson | 426/243 |
| 5,359,923 | A | * | 11/1994 | Boswell | 99/340 |
| 5,768,977 | A | * | 6/1998 | Parris et al. | 99/340 |
| 6,272,976 | B1 | | 8/2001 | Berryman | |
| 6,553,896 | B1 | | 4/2003 | Heide | |

(Continued)

OTHER PUBLICATIONS

English translation of International Preliminary Report on Patentability for PCT/EP2011/066047, Jul. 30, 2013.

(Continued)

*Primary Examiner* — Thor Campbell
(74) *Attorney, Agent, or Firm* — Mannava & Kang, P.C.

(57) ABSTRACT

The invention relates to a barbecue accessory comprising a chicken roaster for preparing poultry, in particular chicken, arranged vertically on a barbecue. The barbecue accessory comprises a chicken roaster formed from a poultry holder and a base plate, and a roasting hood extending over the chicken roaster and surrounding, at least partially the roaster. A gap, through which the hot gases coming from the barbecue penetrate into the roasting hood, is provided between the hood and the base plate of the chicken roaster when in the ready-to-use state.

19 Claims, 3 Drawing Sheets

(56) References Cited

U.S. PATENT DOCUMENTS

| | | |
|---|---|---|
| 6,575,082 B1 | 6/2003 | Liao |
| 6,622,616 B1 * | 9/2003 | Measom ........................ 99/345 |
| 6,874,496 B2 * | 4/2005 | Waits et al. ................. 126/25 R |
| 7,044,050 B1 * | 5/2006 | Cook ............................ 99/482 |
| 7,879,381 B2 * | 2/2011 | Dow et al. ................... 426/523 |
| 8,893,704 B2 * | 11/2014 | Foster .......................... 126/9 R |
| 2015/0079251 A1 * | 3/2015 | Parrish ......................... 426/314 |

OTHER PUBLICATIONS

International Search Report and Written Opinion for PCT/EP2011/066047, European Patent Office, Dec. 6, 2011.

* cited by examiner

BARBECUE ACCESSORY WITH A CHICKEN ROASTER

The present application claims priority under 35 U.S.C. §371 to PCT Application PCT/EP2011/066047, filed on Sep. 15, 2011, which claims priority to Gelman Patent Application No. 20 2011 004 636.2, filed on Mar. 30, 2011, and to German Patent Application No. 20 2011 001 877.6, filed on Jan. 24, 2011, the disclosures of which are hereby incorporated by reference in their entireties.

TECHNICAL BACKGROUND

The invention relates to a grill attachment with a chicken roaster for cooking grillable foods in the form of poultry, in particular chicken, positioned upright on a grill.

PRIOR ART

U.S. Pat. No. 6,622,616 B1 discloses a grill attachment for cooking poultry, in which the grill attachment has a bottom pan, designed to be set on a grill, and a roasting cover that can be connected to the bottom pan and is disposed inside an upwardly protruding collar on the bottom pan. The bottom pan has through-holes for the passage of heat. Also provided is a support in which it is possible to insert a can, on which the fowl is then placed in an upright position. Taken as a whole, this grill attachment is a largely closed system.

Furthermore, the use of a chicken holder with the option of accommodating a beer can is described in U.S. Pat. No. 6,553,896 B1, wherein here again the fowl is disposed in an upright position. Said holder is a simple form of a chicken roaster.

In U.S. Pat. No. 6,272,976 B1, the disclosure relates to placing a fowl to be roasted in an upright position on a bed of coals and covering the food to be grilled with a roasting cover. This roasting cover sits on the coals or is even covered by the coals around its perimeter in such a way that the enclosed chamber is largely sealed.

In the present invention, the aim is to improve the process of cooking poultry using open grills or grills that have been opened, and more particularly to obtain a characteristic roasted food flavor in doing so. Furthermore, the poultry should be juicy on the inside and crispy on the outside. Finally, fat contained in the grillable food should be prevented from dripping onto the grill.

SUMMARY OF THE INVENTION

A grill attachment of the invention for cooking poultry positioned upright on a grill comprises, on the one hand, a chicken roaster composed of a poultry holder and a bottom pan and, on the other hand, a roasting cover extending over said chicken roaster and at least partially enclosing the latter. In the ready for use state there is a gap between the roasting cover and the bottom pan of the chicken roaster through which hot gases ascending from the grill are able to pass into said roasting cover.

A ready for use state is achieved when the bottom pan is set on a grill or on the grate of a grill and the roasting cover is placed over the chicken roaster positioned on the bottom pan.

The bottom pan can advantageously have at least two laterally projecting handles and the roasting cover can have openings for the handles. Thus the bottom pan can be conveniently positioned on the grill and the roasting cover can cover the bottom pan as a hood, even in the region of the handles, despite the lateral extent thereof.

Another grill attachment of the invention for cooking poultry positioned upright on a grill comprises, on the one hand, a chicken roaster consisting of a poultry holder and a bottom pan and, on the other hand, a roasting cover extending over said chicken roaster and at least partially enclosing the latter, while the bottom pan has a laterally extending flange with a plurality of orifices and wherein the orifices are disposed on the flange in such a manner that hot gases ascending from the grill pass into the roasting cover placed on the flange.

The advantage of this arrangement is that a stand-alone and cohesive overall assembly is provided, which obviates the need to set the roasting cover directly on the grill grate.

The poultry holder can have a chamber for the accommodation of a container filled with, or capable of being filled with, a liquid, and the container can be provided with at least one hole for the release of the liquid or vapor during the grilling operation. Such poultry holders are known per se for cooking so-called beer can chicken.

The container in the accommodation device for the poultry holder can thus be held at a distance from the bottom pan, thereby preventing uneven transfer of heat to the container.

Advantageously, the bottom pan can have an edge bent upwardly and away from the grill for catching cooking juices and/or fat emerging from the food being grilled. The handles can also be attached to this edge.

Furthermore, a thermometer that is readable from outside for indicating the temperature inside the roasting cover can be disposed in the top third of the roasting cover.

If a vent opening capable of being closed from outside is provided in the top third of the roasting cover, it is then possible to ventilate the interior chamber of the roasting cover by adjusting the size of the vent opening, as is known per se for closed grills.

The flange can advantageously have a stop element that lies radially outwardly to a further extent than the orifices. All of the gases required for grilling the food positioned under the roasting cover thus flow into the roasting cover exclusively via the orifices.

Moreover, the flange can merge into handles, or discretely configured handles can be joined to the flange.

BRIEF DESCRIPTION OF THE DRAWINGS

An exemplary embodiment of the invention is illustrated in the drawings, in which.

DESCRIPTION OF AN EXEMPLARY EMBODIMENT

Figure 1:
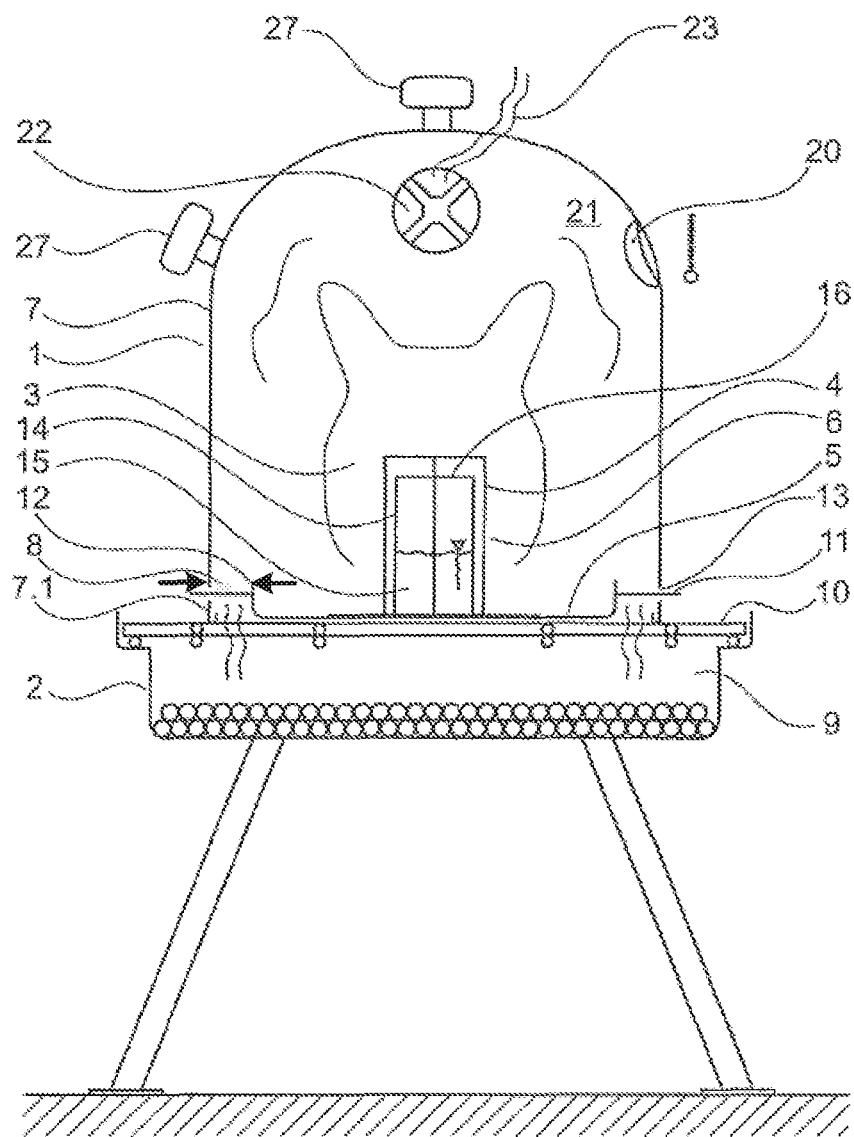
FIG. 1 is a basic diagram of a grill attachment of the invention for use on an open grill or a grill that has been opened.

FIG. 1 shows a grill attachment 1 of the invention for cooking grillable food in the form of poultry 3 positioned upright on a grill 2, which grill attachment comprises, on the one hand, a chicken roaster 6 composed of a poultry holder 4 and a bottom pan 5 and, on the other hand, a roasting cover 7 extending over the chicken roaster 6 and at least partially enclosing the latter. In the ready for use state, there is a gap 8 between the roasting cover 7 and the bottom pan 5 of the chicken roaster 6, through which gap hot gases 9 ascending from a bed of coals in the grill 2 are able to pass into the roasting cover 7.

In the illustrated ready for use state of the grill attachment, the bottom pan 5 is situated on a grate 10 of the grill 2 and the roasting cover 7 is placed over the chicken roaster 6 positioned on the bottom pan 5 and sits on the grate 10.

The bottom pan 5 has two laterally projecting handles 11 that are mounted on an edge 12 of the bottom pan 5 bent upwardly and away from the grill 2, which edge 12 is adapted to catch cooking juice and/or fat emerging from the food being grilled 3. The bottom pan 5 can be configured as a closed entity if it is necessary to prevent fat emerging from the grilled food from dripping into the underlying bed of coals. For the same reason, the roasting cover 7 can have an inwardly upturned U-shaped peripheral edge 7.1 in which fat spattered against, and running down, the inside surface of the roasting cover will collect.

The roasting cover 7 has openings 13 for the handles 11 in order that the bottom pan 5 can be conveniently positioned on the grill 2 and also in order that the roasting cover 7 will cover the bottom pan 5 as a hood including in the region of the handles 11 despite the lateral extent of said handles 11.

The poultry holder 4 has an accommodation chamber 14 extending away from the bottom pan 5 for a container 16 filled with, or capable of being filled with, a liquid 15, which container 16 is provided with at least one hole for the release of liquid or vapor during the grilling operation, see FIG. 2 below. Such poultry holders 4 for cooking so-called beer can chicken are known per se and can be made of shaped wire netting.

The container 16 can be held in the accommodation chamber 14 of the poultry holder 4 at a distance from the bottom pan 5, thereby avoiding an uneven transfer of heat to the container 16.

Furthermore, a thermometer 20 that is readable from outside for indicating the temperature in the interior 21 of the roasting cover 7 can be disposed in the top third of the roasting cover 7.

Also disposed in the top third of the roasting cover 7 is a vent opening 22, which is capable of being closed from outside and by means of which the interior 21 of the roasting cover can be ventilated to a degree depending on the variable size of the opening, as known per se for closed grills. The gases 9 ascending from the grill flow into the roasting cover 7 and past the poultry 3, and can exit therefrom through the vent opening 22, as indicated, in the form of gas 23.

Figure 2:
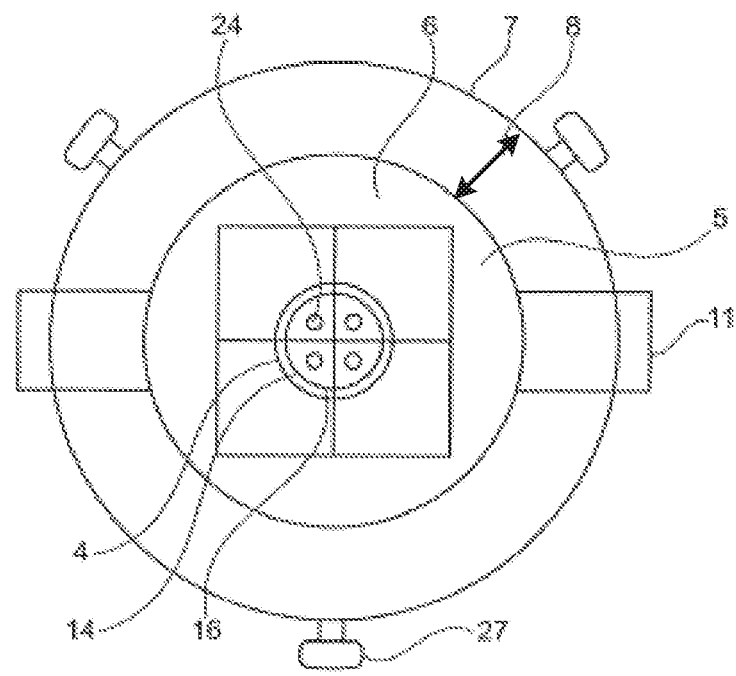
FIG. 2 is a top view of the chicken roaster composed of a poultry holder and a bottom pan as shown in FIG. 1.

The chicken roaster 6 composed of the poultry holder 4 and the bottom pan 5, as shown in FIG. 1, is illustrated in FIG. 2 as a top view such that holes 24 in the container 16 present in the accommodation chamber 14 of the poultry holder 4 are discernible.

It is also shown that a gap 8 is present between the bottom pan 5 and the roasting cover 7, which gap should be at least 10 mm wide, but is preferably from 20 mm to 50 mm wide, in order to permit sufficient in-flow of the hot gases ascending from the grill. It is precisely this in-flow of hot gases that is conducive to the typical taste of the grilled food.

It may further be seen that the roasting cover 7 has openings 13 in the region of the handles 11 extending away from the bottom pan 5 so that a portion of the handles 11 lies inside the roasting cover 7 and a portion of the handles 11 lies outside the roasting cover 7.

Figure 3:
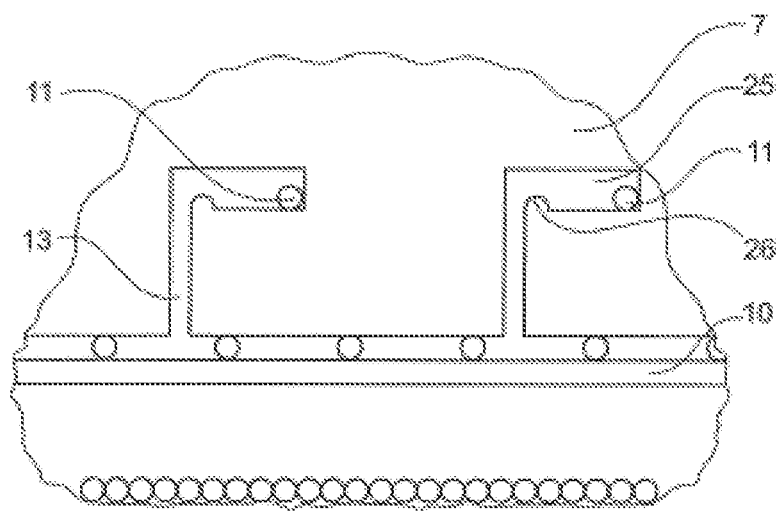
FIG. 3 shows a detail of a roasting cover as shown in FIG. 1 in the region of a handle.

A detail of the roasting cover 7, as shown in FIG. 1, in the region of the handle 11, more specifically the opening 13, is illustrated in FIG. 3. This opening 13 has a vertically oriented section for allowing the roasting cover 7 to move along the handles 11 for the purpose of setting it down on the grate 10 of a grill.

The opening 13 also has a locking section 25 with a restriction 26, which section 25 is positioned at right angles to the vertically extending section. By gradually turning the roasting cover 7 about its longitudinal axis, the restriction 26 can be surmounted so as to move the handle 11 to the locking section 25. In this position, the entire grill attachment 1 can be lifted by way of the roasting cover 7, to which end the latter has one or more handles 27 (FIG. 1, FIG. 2).

Figure 4:
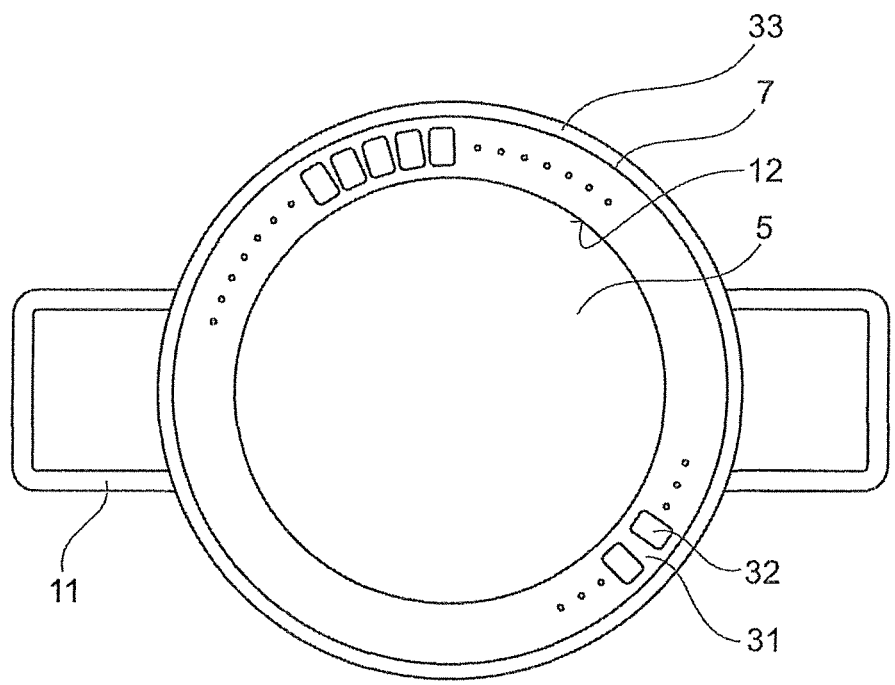
FIG. 4 is a top view of another grill attachment of the invention having a perforated edge, with the roasting cover omitted.

A top view of an alternative embodiment comprising a grill attachment having a perforated edge and with the roasting cover omitted is illustrated in FIG. 4. The bottom pan 5 again has an upwardly extending edge 12 which is adjoined, however, by a flange 31 which extends laterally outwardly to a further extent and in which a plurality of orifices 32 is distributed in the peripheral direction. Despite the orifices 32, the radial extent and rigidity of the flange are such that the roasting cover 7 (represented by a circular line) can be positioned radially outside the orifices 32 on the flange 31. To prevent the roasting cover 7 from sliding, there is also provided on the flange 31 a radially acting stop member in the form of an upwardly protruding bead 33, which lies radially outwardly to a further extent than the openings 32. This flange 31 can also merge into the handles 11, or the handles can be discretely configured and joined to the flange 31.

Figure 5:
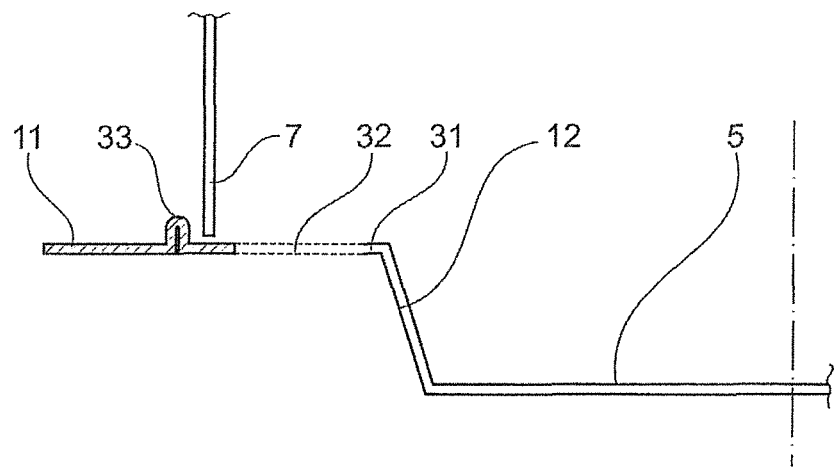
FIG. 5 is a cross-section of a detail as shown in FIG. 4, with the roasting cover in place.

In this embodiment, the orifices 32 in the flange 31 perform the same function as the gap 8 illustrated in FIG. 1, as shown in greater detail in FIG. 5, which is a cross-section of a detail of FIG. 4. The figure shows a portion of the bottom pan 5, which is adjoined by the upwardly extending edge 12, which in turn merges into the flange 31 extending in the lateral direction such that said flange 31 is vertically offset relatively to the bottom pan 5. An orifice 32 extending in the radial direction is formed in the flange 31, and the flange 31 has said bead 33 lying radially outwardly to a further extent. The bead 33 is thus disposed far enough in the radially outward direction on the flange 31 to permit the roasting cover 7 to be set on the flange 31 with the orifice 32 lying within the space disposed above the bottom pan 5 and covered by the roasting cover 7. The handles 11 are positioned outwardly to an even further extent.

The hot gases required for grilling the food (not shown) disposed inside the roasting cover 7 on the bottom pan 5 are thus able to pass into the roasting cover through these openings 32 without having to set the roasting cover 7 on the grill grate, as is required in the exemplary embodiment illustrated in FIG. 1.

The invention claimed is:

1. A grill attachment for cooking grillable food in the form of poultry positioned upright on a grill, the grill attachment comprising:
   a chicken roaster including a poultry holder and a bottom pan; and
   a roasting cover extending over and engaging contiguously with the chicken roaster and at least partially enclosing the chicken roaster,
   wherein in a ready for use state, there is a generally annular gap positioned between the roasting cover and the bottom pan of the chicken roaster, through which gap hot gases ascending from a bed of coals in the grill are able to pass directly from the bed of coals into the roasting cover, and wherein the gap is formed between an outermost wall or end of the bottom pan and an inner wall or end of the roasting cover.

2. The grill attachment according to claim 1, wherein the bottom pan comprises at least two laterally projecting handles and the roasting cover comprises openings in a sidewall thereof for the handles.

3. The grill attachment according to claim 1, wherein aside from at least two laterally projecting handles, no structure extends beyond the bottom pan to connect the bottom pan to the roasting cover.

4. A grill attachment for cooking grillable food in the form of poultry positioned upright on a grill, the grill attachment comprising:

a chicken roaster including a poultry holder and a bottom pan; and a roasting cover extending over and engaging contiguously with the chicken roaster and at least partially enclosing the chicken roaster, wherein the bottom pan comprises a laterally extending flange having a plurality of orifices and the orifices are disposed in the flange such that the hot gases ascending from the grill pass directly from a bed of coals into the roasting cover mounted on the flange wherein the bottom pan further comprises a central enclosed surface between the plurality of orifices, and wherein the central enclosed surface is formed in a different plane than a plane of the flange.

5. The grill attachment according to claim 4, wherein the plane of the central enclosed surface is generally parallel to the plane of the flange.

6. The grill attachment according to claim 4, wherein the poultry holder comprises an accommodation chamber for a container filled with, or capable of being filled with, a liquid, and the container is provided with at least one hole for release of the liquid during the grilling operation.

7. The grill attachment according to claim 6, wherein the container is held in the accommodation chamber of the poultry holder at a distance from the bottom pan.

8. The grill attachment according to claim 4, wherein the bottom pan comprises an edge that is bent upwardly and away from the grill for collecting at least one of cooking juice and dripping emerging from the food being grilled.

9. The grill attachment according to claim 8, comprising handles mounted on the edge.

10. The grill attachment according to claim 4, wherein in an upper third of the roasting cover there is disposed a thermometer that is readable from outside and serves to indicate the temperature in the interior of the roasting cover.

11. The grill attachment according to claim 4, wherein in an upper third of the roasting cover there is disposed a vent opening that is capable of being closed from outside.

12. The grill attachment according to claim 4, wherein the flange has a stop member that is located radially outwardly to a further extent than the orifices.

13. The grill attachment according to claim 4, wherein the flange merges into handles or discrete handles are joined to the flange, and wherein the handles extend away from the flange, and are oriented generally parallel to the flange.

14. The grill attachment according to claim 1, wherein the gap is formed in the roasting cover to communicate with an opening between the bottom pan and the roasting cover to allow for hot gases ascending from the bed of coals in the grill to pass from the bed of coals into the roasting cover along an axis that is generally parallel to a central axis of the roasting cover and via the opening between the bottom pan and the roasting cover.

15. The grill attachment according to claim 4, wherein in a ready for use state, the different plane is closer to a side of the flange facing the grill.

16. The grill attachment according to claim 4, wherein the central enclosed surface is configured to prevent release of liquid into the grill.

17. The grill attachment according to claim 4, wherein the central enclosed surface forms a depression in the bottom pan.

18. The grill attachment according to claim 4, wherein the central enclosed surface is configured such that the hot gases ascending from the grill are directed to pass directly from the bed of coals into the roasting cover mounted on the flange via the orifices.

19. A grill attachment for cooking grillable food positioned upright on a grill, the grill attachment comprising:

a grillable food roaster including a grillable food holder and a bottom pan; and a roasting cover extending over and engaging contiguously with the grillable food roaster and at least partially enclosing the grillable food roaster, wherein in a ready for use state, there is a generally annular gap positioned between the roasting cover and the bottom pan of the grillable food roaster, through which gap hot gases ascending from a cooking source in the grill are able to pass directly from the cooking source into the roasting cover, and wherein the gap is formed between an outermost wall or end of the bottom pan and an inner wall or end of the roasting cover.

* * * * *